US012021297B2

(12) United States Patent
Öjefors et al.

(10) Patent No.: US 12,021,297 B2
(45) Date of Patent: Jun. 25, 2024

(54) INTEGRATED CIRCUIT PACKAGE COMPRISING A CROSSED DIPOLE ANTENNA

(71) Applicant: Sivers Wireless AB, Kista (SE)

(72) Inventors: Erik Öjefors, Uppsala (SE); Dragos Dancila, Uppsala (SE); Imran Aziz, Uppsala (SE); Johanna Hanning, Hisings Backa (SE)

(73) Assignee: Sivers Wireless AB (SE)

( * ) Notice: Subject to any disclaimer, the term of this patent is extended or adjusted under 35 U.S.C. 154(b) by 136 days.

(21) Appl. No.: 17/669,470

(22) Filed: Feb. 11, 2022

(65) Prior Publication Data

US 2022/0263223 A1 Aug. 18, 2022

(30) Foreign Application Priority Data

Feb. 12, 2021 (EP) .................................... 21156928

(51) Int. Cl.
*H01Q 1/22* (2006.01)
*H01Q 1/24* (2006.01)
(Continued)

(52) U.S. Cl.
CPC ......... *H01Q 1/2283* (2013.01); *H01Q 19/106* (2013.01); *H01Q 19/108* (2013.01);
(Continued)

(58) Field of Classification Search
CPC .. H01Q 1/2283; H01Q 19/106; H01Q 19/108; H01Q 21/062; H01Q 21/26;
(Continued)

(56) References Cited

U.S. PATENT DOCUMENTS 6,140,972 A * 10/2000 Johnston ................ H01Q 25/00 343/893
9,583,811 B2 2/2017 Seler et al.
(Continued)

FOREIGN PATENT DOCUMENTS

EP 3 346 544 A1 7/2018

OTHER PUBLICATIONS

M. Wojnowski, C. Wagner, R. Lachner, J. Böck, G. Sommer and K. Pressel, "A 77-GHz SiGe single-chip four-channel transceiver module with integrated antennas in embedded wafer-level BGA package," 2012 IEEE 62nd Electronic Components and Technology Conference, 2012, pp. 1027-1032, doi: 10.1109/ECTC.2012.6248962.

*Primary Examiner* — Hoang V Nguyen
*Assistant Examiner* — Yonchan J Kim
(74) *Attorney, Agent, or Firm* — Condo Roccia Koptiw LLP

(57) ABSTRACT

An integrated circuit package is provided. The integrated circuit package comprises a transceiver radio-frequency integrated circuit, RFIC, and at least one antenna array formed in a redistribution metal layer of the integrated circuit package, and is arranged in a fan-out area of the RFIC. The at least one antenna array comprises at least one crossed dipole antenna. Each crossed dipole antenna comprises a first dipole comprising two first legs, and a second dipole comprising two second legs, and two leg pairs, each leg pair comprising one first leg of the first dipole and one second leg of the second dipole, and two feed lines. Each feed line is coupled to a respective leg pair at a center of the crossed dipole antenna. At least a part of each feed line is arranged between the two leg pairs.

20 Claims, 5 Drawing Sheets

(51) Int. Cl.
*H01Q 19/10* (2006.01)
*H01Q 21/06* (2006.01)
*H01Q 21/26* (2006.01)

(52) U.S. Cl.
CPC ........... *H01Q 21/062* (2013.01); *H01Q 21/26* (2013.01); *H01Q 1/241* (2013.01)

(58) Field of Classification Search
CPC .......... H01Q 1/241; H01Q 9/28; H01Q 21/08; H01Q 21/00; H01Q 1/02; H01Q 1/50; H05K 1/02
See application file for complete search history.

(56) References Cited

U.S. PATENT DOCUMENTS

| | | | | |
|---|---|---|---|---|
| 10,461,399 | B2 | 10/2019 | Ndip et al. | |
| 2010/0171590 | A1* | 7/2010 | Perkins, III | H01Q 21/29 343/797 |
| 2010/0193935 | A1 | 8/2010 | Lachner et al. | |
| 2014/0236546 | A1* | 8/2014 | Payne | H01Q 9/28 703/2 |
| 2017/0236776 | A1* | 8/2017 | Huynh | H01L 23/49822 438/26 |
| 2019/0036220 | A1* | 1/2019 | Paulotto | H01Q 9/045 |
| 2019/0140364 | A1* | 5/2019 | Mirmozafari | H01Q 1/246 |
| 2022/0158333 | A1* | 5/2022 | Smith | H01Q 1/28 |

* cited by examiner

INTEGRATED CIRCUIT PACKAGE COMPRISING A CROSSED DIPOLE ANTENNA

CROSS REFERENCE TO RELATED APPLICATIONS

This application claims priority from EP Application No. 21156928.0, filed Feb. 12, 2021, the entire contents of which are hereby incorporated by reference herein.

FIELD OF THE INVENTION

The present invention is generally related to integrated circuit packages comprising at least one crossed dipole antenna.

BACKGROUND OF THE INVENTION

The use of smart devices is increasing exponentially, and smart devices often need to be able to transmit and to receive signals via a wireless communication link. Further, the advent of 5G has increased, and continues to increase, the use of antennas operating within the 1 to 30 GHz spectrum. Therefore, the use of millimeter wave antennas is rapidly increasing. Some solutions use antennas integrated with an integrated circuit chip. The integrated circuit chip may, for example, be a radio frequency chip using integrated fan-out wafer level packaging (InFO-WLP) technology, or similar packing technologies. The transmission lines of such solutions typically use a rectangular waveguide to transmit and/or receive signal to/from antennas of an integrated circuit package. A main driver for the combination of InFO-WLP and integrated antennas has been the reduced signal loss in the feedline between the chip and the antenna. A problem of the current technology is its inability to provide match polarization for a circular polarized antenna. Additionally, a problem of the current technology is its mutual coupling and/or disturbances from other parts of a device which disturbs and/or blocks the antennas of the device.

U.S. Pat. No. 9,583,811 B2 discloses a microwave device including a semiconductor package comprising a microwave semiconductor chip and a wave-guide part associated with the semiconductor package.

SUMMARY OF THE INVENTION

It is of interest to provide an integrated circuit package comprising at least one crossed dipole antenna formed in a redistribution metal layer of integrated circuit package, which has a small form factor, a reduced disturbance, and an increased antenna gain. Additionally, it is of interest to provide a circular polarized antenna, thereby making the orientation independent of an antenna element of a device with which the circular polarized antenna is communicating with. Further, by providing the antenna in package, the need for special high frequency materials is replaced with the use of standard cost-effective PCB material.

These interests are met by providing an arrangement having the features in the independent claims. Preferred embodiments are defined in the dependent claims.

Hence, according to an aspect of the present invention, there is provided an integrated circuit package. The integrated circuit package may be an embedded wafer level ball grid array, eWLB. The integrated circuit package may comprise a transceiver radio-frequency integrated circuit, RFIC. The RFIC may be understood as, for example, a chip, a chipset and/or a die. The RFIC may be a transceiver RFIC. The RFIC may be a transceiver RFIC configured for any frequency between 1 to 45 GHz. Preferably, the RFIC may be a 24.25 GHz-29.5 GHz transceiver RFIC or a 37 GHz-43.5 GHz transceiver RFIC. More preferably, the RFIC may be a 28 GHz transceiver RFIC. The integrated circuit package may comprise at least one antenna array. The antenna array may be configured for beam steering. The antenna array may be capable of beam steering of ±50°. The at least one antenna array may be formed in a redistribution metal layer, RDL, of the integrated circuit package. By the term "the at least one antenna array may be formed in a redistribution metal layer, RDL, of the integrated circuit package" it may be understood that, for example, the at least one antenna array is comprised by the RDL, the at least one antenna array is realized in the RDL, and/or that the at least one antenna array is arranged within the RDL. The at least one antenna array may be a planar antenna array. The at least one antenna array may be arranged in a fan-out area of the integrated circuit package. The at least one fan-out area may comprise mold compound. The at least one antenna array may be configured to transmit and/or receive signals through the mold compound of the fan-out area. The at least one antenna array may comprise at least one crossed dipole antenna. Each crossed dipole antenna may comprise a first dipole comprising two first legs, a second dipole comprising two second legs, and two leg pairs. The first legs and the seconds leg may be understood as, for example, dipole legs of the first dipole and the second dipole, respectively. Each leg pair may comprise one first leg of the first dipole and one second leg of the second dipole of its corresponding crossed dipole antenna. The integrated circuit package may comprise at least one pair of feed lines formed in the RDL. Each feed line of each pair of feed lines may be coupled between a respective leg pair of a respective crossed dipole antenna and the RFIC. Each pair of feed lines may extend from a center of the respective crossed dipole antenna towards the RFIC between a neighboring first leg and a neighboring second leg of the two leg pairs of the respective crossed dipole antenna. The neighboring first leg and the neighboring second leg may belong to different leg pairs of the two leg pairs. The feed lines may be understood as, for example, transmission lines. Hence, the crossed dipole antennas and their respective feed lines may be realized in planar transmission line technology. In other words, the crossed dipole antennas and their respective feed lines may be realized in a single metal layer.

According to an aspect of the present invention, there is provided an arrangement. The arrangement may comprise an integrated circuit package according to another aspect of the invention. The arrangement may further comprise a heatsink element. The heatsink element may be arranged on the RFIC of the integrated circuit package.

According to an aspect of the present invention, there is provided a system. The system may comprise an arrangement according to another aspect of the invention. The system may further comprise a printed circuit board, PCB. The arrangement may be mounted to the PCB. By the term "mounted" is further meant, for example, attached, arranged and/or soldered.

The at least one antenna array and the at least one pair of feed lines may be arranged in a plane of the RDL. In other words, the at least one antenna array and the at least one pair of feed lines may be arranged in and/or along a plane, wherein in the plane is arranged within the RDL. Said plane may be further be understood as a surface. Hence, the form factor of the integrated circuit package may thereby be reduced. The at least one antenna array and the at least one pair of feed lines may be realized in planar technology. Further, the at least one antenna array and the at least one pair of feed lines may be realized in planar technology within the RDL.

Each pair of feed lines may be extending from the center of the respective crossed dipole antenna in a first direction. The first direction may be arranged at an angle of substantially 45° with regards to longitudinal axes of the neighboring first leg and the neighboring second leg of the two leg pairs. The neighboring first leg and the neighboring second leg may be comprised by different leg pairs of the two leg pairs. Hence, interference reduced antenna performance caused by feedlines on the crossed dipole antenna may be mitigated and/or reduced. In other words, the first direction may be arranged at an angle of substantially 45° with regards to longitudinal axes of a first leg of a first leg pair of the two leg pairs and a second leg of a second leg pair of the two leg pairs. Correspondingly, the first direction may be arranged at an angle of substantially 45° with regards to longitudinal axes of a second leg of a first leg pair of the two leg pairs and a first leg of a second leg pair of the two leg pairs. The interference may be at a minimum when the feed lines are arranged at an angle of substantially 45° with regards to longitudinal axes of a neighboring first leg and a neighboring second leg of the two leg pairs. However, it is to be understood that said angle may be between 35 to 45° with regards to a longitudinal axis of one of the neighboring first leg and the neighboring second leg. Each pair of feed lines may extend along the first direction from the center of the respective crossed dipole antenna to a turning point. A distance between the center and the turning point may be less than a length of the second leg. The feed lines may be arranged parallel to each other from the center of the crossed dipole antenna. A distance between the two feed lines may be substantially zero, or less than a width of the feed lines.

Each crossed dipole may be a circular polarized antenna. In order for a crossed dipole antenna to be a circular polarized antenna there has to be a relation between the lengths of the first legs and second legs of the crossed dipole antenna. For a crossed dipole antenna arranged in a redistribution metal layer, without feed lines coupled to said crossed dipole antenna, or feed lines extending orthogonally of the crossed dipole antenna, the relation is 1.55. In order to maintain circular polarization of the crossed dipole antenna when feed lines are introduced in the redistribution metal layer and coupled to the crossed dipole antenna, the relation has to be adjusted. A first length of each first leg of the at least one crossed dipole antenna may be longer than a second length of each second leg of the at least one crossed dipole antenna. The first length may have to be increased by 11% and the second length may have to be increased by 6% in order to adjust the specific relation such that the crossed dipole antenna to which feed lines are coupled maintains circular polarization. The relation between a first length of each first leg of the at least one crossed dipole antenna and a second length of each second leg of the at least one crossed dipole antenna is between 1.52 and 1.68. Preferably, the relation between a first length of each first leg of the at least one crossed dipole antenna and a second length of each second leg of the at least one crossed dipole antenna is 1.62. Thereby, the crossed dipole antenna may be a circular polarized antenna formed in a redistribution metal layer, which is coupled to feed lines formed in the same redistribution metal layer.

Lengths and widths of the legs of a crossed dipole antenna determine the impedance of the crossed dipole antenna. It is of interest to have relatively wide legs, since that makes production of said crossed dipole antenna easier. Further, wider legs reduce ohmic losses. A relation between length and width of first legs of a crossed dipole antenna may be between 6.8 and 7.6. Preferably, the relation between length and width of first legs of a crossed dipole antenna may be 7.2. It is to be understood that the length of the first legs is greater than the width of the first legs. A relation between length and width of second legs of a crossed dipole antenna may be between 4.2 and 4.8. Preferably, the relation between length and width of second legs of a crossed dipole antenna may be 4.5. It is to be understood that the length of the second legs is greater than the width of the second legs. The width of the first legs and the second legs is equal. The width of the first legs and the second legs may be between 0.018 and 0.022 of a wavelength which the crossed dipole antenna is configured for. Preferably, the width of the first legs and the second legs may be 0.02 of a wavelength which the crossed dipole antenna is configured for. The length of the first legs may be 0.14, or 1/7, of a wavelength which the crossed dipole antenna is configured for. The length of the second legs may be 0.09, or 1/11, of a wavelength which the crossed dipole antenna is configured for. The wavelength which the crossed dipole antenna is configured for may be understood as a free space wavelength.

Thereby, a phase difference between the first dipole and the second dipole of the crossed dipole antenna can be adjusted. In other words, the phase difference between the first dipole and the second dipole of the crossed dipole antenna can be adjusted by adjusting the first length and the second length.

The first dipole of each crossed dipole antenna may have a first angle of input admittance and the second dipole of each crossed dipole antenna may have a second angle of input admittance. The first angle of input admittance and the second angle of input admittance may differ by 90°. The first length and the second length may be determined such that the first angle of input admittance and the second angle of input admittance differs by 90°.

The two feed lines may be understood as, for example, transmission lines, groundless transmission lines, differential transmission lines and/or groundless differential transmission lines. The two feed lines of pair of feed lines may each be fed a signal by the RFIC. The two signals fed to said two feed lines of each pair of feed lines may have a phase difference of 180°. The RFIC may feed a first signal to one feed line of pair of feed lines and a second signal to another feed line of said pair of feed lines. By the term "feed" it is further meant, for example, output, provide and/or supply. The RFIC may comprise at least two phase shifter outputs configured to feed the first signal and/or the second signal. A separate phase shifter output may be for the first signal and the second signal respectively.

The integrated circuit package may comprise at least two antenna arrays. A first antenna array of the at least two antenna arrays may be arranged in a first fan-out area of the fan-out area. A second antenna array of the at least two antenna arrays may be arranged in a second fan-out area of the fan-out area. The first fan-out area and the second fan-out area may be arranged at opposites sides of the RFIC. The first antenna array and the second antenna array of the at least two antenna arrays may be arranged at opposites sides of the RFIC.

Each antenna array may comprise at least four crossed dipole antennas. However, it is to be understood that each antenna array may comprise any number of crossed dipole antennas. For example, an antenna array may comprise, for example, one, two, three, four, five, six, seven, eight, or more crossed dipole antennas. Further, the integrated circuit package may comprise at least two antenna arrays, wherein different antenna arrays may comprise a different number of crossed dipole antennas. The crossed dipole antennas of an antenna array may be arranged in a row, a plurality of rows, a column, a plurality of columns, a grid, and/or a matrix. For example, the crossed dipole antennas of an antenna array may be arranged in along a number of aligned rows, wherein each row may comprise the same number of crossed dipole antennas.

The heatsink element may be configured to cool the RFIC. The heatsink element of the arrangement may be arranged between the first fan-out area and the second fan-out area. The heatsink element may be arranged on top of the RFIC. The heatsink may be arranged such that it does not cover the at least one antenna array. The heatsink may be arranged such that the first fan-out area and the second fan-out area are not covered by the heatsink element. Hence, disturbance and/or blockage of the at least one antenna array may be reduced. Additionally, the heatsink element may be at least a part of a reflector wall which may be configured to increase the gain of the at least one antenna array.

The PCB may comprise a reflective metal layer. The PCB may further comprise a plurality of vias. The RFIC of the printed circuit board may be mounted at the plurality of vias. The plurality of vias may be understood as, for example, a fencing, and/or a via fencing. The plurality of vias may be arranged through the PCB, or from a top side of the PCB towards a bottom side of the PCB, and/or from a top side of the PCB to the reflective metal layer of the PCB. The plurality of vias may be arranged along a rectangular shape. The rectangular shape may be arranged in a plane which is parallel to reflective metal layer. The plurality of vias may be at least a part of a reflector wall which may be configured to increase the gain of the at least one antenna array.

The at least one antenna array of the arrangement may be configured for communication at a specific wavelength. For example, the wavelength at 28 GHz is 10.7 mm, and the at least one antenna array may be configured for communication at a wavelength of 10.7 mm. By the term "communication" is further meant, for example, transmitting and/or receiving signals. The at least one antenna array may be arranged at a first distance from the reflective metal layer. The at least one antenna array may be arranged at a second distance from the plurality of vias. The first distance may be a quarter of the specific wavelength. Thereby producing constructive interference of the waves which may increase the antenna gain. The second distance may be between one-half and three-quarters of the specific wavelength. Thereby, the circular polarization of the crossed dipole antennas may be maintained. In other words, the performance of the circular polarization may be increased. Thereby the gain of the at least one antenna array may be increased. The heatsink element may have a height which is equal to the substantially three-tenths of the specific wavelength. Thereby the disturbance of the heatsink element is diminished, which optimizes the antenna gain. However, the heatsink element may have height which is less than three-tenths of the specific wavelength.

The heatsink element, the RFIC and the plurality of vias may form a reflector wall. The reflector wall may be arranged between antenna arrays of an integrated circuit package comprising at least two antenna arrays. The reflective metal layer and the reflector wall may form a corner reflector antenna. The placement of the corner reflector antenna may be configured to maintain the circular polarization of the crossed dipole antennas and not adversely affect the gain. Hence, the corner reflector antenna may increase the performance of the circular polarization.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
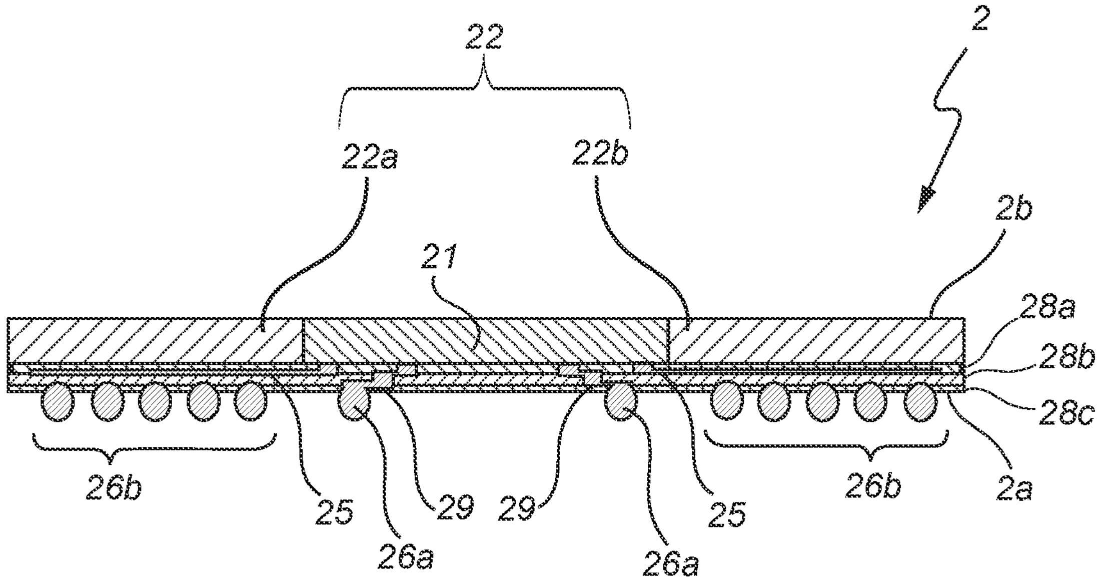
FIG. 1 schematically shows a cross-sectional view of an integrated circuit package according to an exemplifying embodiment of the present invention.

FIG. 1 schematically shows a cross-sectional view of an integrated circuit package 2 according to an exemplifying embodiment of the present invention. The integrated circuit package 2 comprises a first side 2*a* and second side 2*b*. The first side 2*a* and the second side 2*b* are opposite to each other. The first side 2*a* comprises bumps 26*a*, 26*b*. The bumps 26*a*, 26*b* comprise interconnect elements 26*a*. Further, the bumps 26*a*, 26*b* comprise dummy bumps 26*b*. The integrated circuit package 2 comprises three passivation layers 28*a*, 28*b*, 28*c*. One of the passivation layers 28*c* comprises the first side 2*a*. The passivation layers 28*a*-28*c* extend along the length and width of the integrated circuit package 2. The integrated circuit package 2 comprises a first redistribution metal layer, RDL, 25. The first RDL 25 is arranged between two of the passivation layers 28*a*, 28*b*. The integrated circuit package 2 comprises two antenna arrays 100, see FIG. 3. It is to be understood that each antenna array 100 may comprise a plurality of antennas and/or antenna arrays. The antenna arrays 100 may each comprise at least one crossed dipole antenna 10, see FIG. 2. The antenna arrays 100 are formed in the first RDL 25. The integrated circuit package 2 comprises a die constituting a radio frequency integrated chip, RFIC, 21. The RFIC 21 is arranged on top of the passivation layers 28*a*-28*c*, opposite the first side 2*a*. Further, the RFIC 21 is arranged at the middle of integrated circuit package 2 with regards to the length and width of the integrated circuit package 2. The first RDL 25 is coupled to the RFIC 21. Hence, a portion of the first RDL 25 is extending through one of the passivation layers 28*a* to the RFIC 21. The antenna arrays 100 are coupled to the RFIC 21 via the first RDL 25. The integrated circuit package 2 comprises a second RDL 29. A portion of the second RDL 29 is extending through two of the passivation layers 28*a*, 28*b* to the RFIC 21. The interconnect elements 26*a* are coupled to the RFIC 21 via the second RDL 29. The first RDL 25 and the second RDL 29 are arranged between the passivation layers 28*a*-28*c*. Hence, the second RDL 29 is arranged between the passivation layer 28*c* comprising the first side 2*a* and a middle passivation layer 28*b*, and the first RDL 25 is arranged between the middle passivation layer 28*b* and a passivation layer 28*a* adjacent to the RFIC 21. The integrated circuit package 2 comprises a fan-out area 22. The fan-out area 22 comprises a mold compound. The fan-out area 22 comprises a first fan-out area 22*a*, and a second fan-out area 22*b*, see FIG. 4. The first and second fan-out areas 22*a*, 22*b* are arranged at the sides of the die constituting the RFIC 21. The first and second fan-out areas 22*a*, 22*b* are the parts of the fan-out area 22 which comprises the at least one antenna array 100. The mold compound of the fan-out area 22 is arranged on top of the passivation layers 28*a*-28*c* and the metal redistribution layers 25, 29, opposite to the first side 2*a* and around the RFIC 21. A top of the RFIC 21 is exposed. The mold compound does not cover the top of the RFIC 21. However, it is to be understood that the mold compound may be arranged on top of the RFIC 21 as well. A top of the RFIC 21 and the mold compound comprise the second side 2*b*. The at least one antenna arrays 100 are configured to transmit and/or receive radio signals through the mold compound of the first and second fan-out areas 22*a*, 22*b*.

Figure 2:
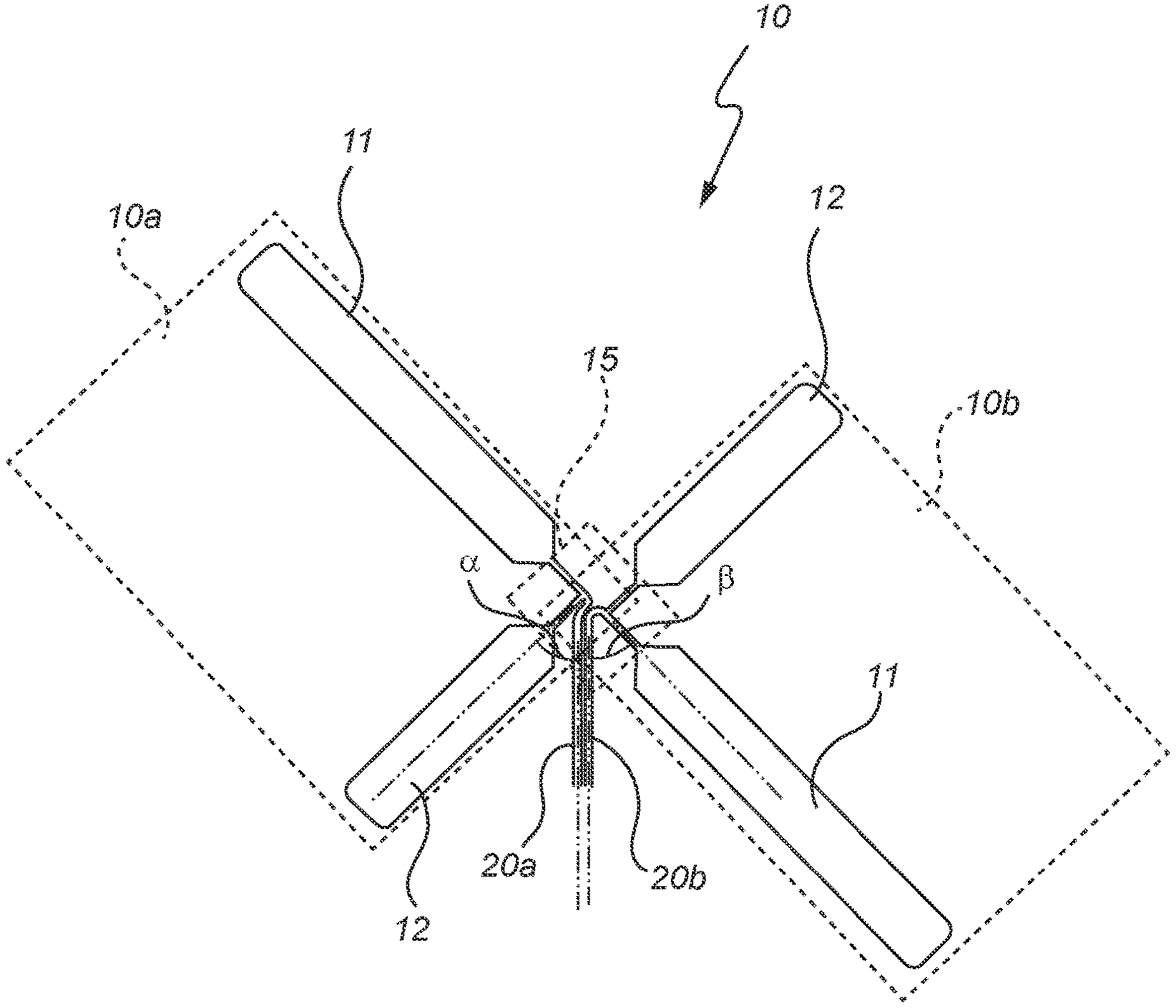
FIG. 2 schematically shows a perspective view of a crossed dipole antenna according to an exemplifying embodiment of the present invention.

FIG. 2 schematically shows a perspective view of a crossed dipole antenna 10 according to an exemplifying embodiment of the present invention. The perspective view of FIG. 2 shows the crossed dipole antenna 10 as arranged in a plane, wherein the viewing angle is perpendicular to said plane. The crossed dipole antenna 10 is arranged in a first RDL 25, which may be understood as comprising said plane. The crossed dipole antenna 10 may be understood as being formed in, formed by, and or comprised by the first RDL 25. The crossed dipole antenna 10 comprises a first dipole and a second dipole. The first dipole comprises two first legs 11. The second dipole comprises two second legs 12. Further, the crossed dipole antenna 10 comprises two leg pairs 10*a*, 10*b*, which may be understood as a first leg pair 10*a* and a second leg pair 10*b*. Each leg pair 10*a*, 10*b* comprises one first leg 11 of the first dipole and one second leg 12 of the second dipole. The first leg 11 and the second leg 12 of each leg pair 10*a*, 10*b* are arranged at a right angle with regards to longitudinal axes of said first leg 11 and said second leg 12. The two first legs 11 are arranged in parallel with regards to the longitudinal axes of the first legs 11. The two first legs 11 are aligned with regards to the longitudinal axes of the first legs 11. The two second legs 12 are arranged in parallel with regards to the longitudinal axes of the second legs 12. The first leg pair 10*a* and the second leg pair 10*b* have substantially the same shape. However, the first leg pair 10*a* and the second leg pair 10*b* are rotated 180° in the plane with regards to each other. The crossed dipole antenna 10 comprises a center 15. Each leg 11, 12 comprises a proximal end and a distal end. The proximal ends of the legs 11, 12 are arranged at the center 15. The first legs 11 are extending in opposite directions from their respective proximal end towards their respective distal end. The second legs 12 are extending in opposite directions from their respective proximal end towards their respective distal end. A direction of extension of a first leg 11 is perpendicular to a direction of a second leg 12. Hence, the first legs 11 and the second legs 12 may be understood as being arranged in an X-shape, a +-shape or a cross. The first and second legs 11, 12 have rectangular shapes, wherein the shape narrows at the respective proximal ends. Hence, the first and second legs 12 may be understood to have a rectangular arrow shape. The first legs 11 are longer than the second legs 12. Hence, the first legs 11 and the second legs 12 have different lengths. Thereby, the first dipole and the second dipole of the crossed dipole antennas 10 have different dipole lengths. The first legs 11 and the second legs 12 have the same width. A relation between the length and the width of the first legs 11 is 7.2. A relation between the length and the width of the second legs is 4.5. A relation between the length of the first legs 11 and the length of the second legs is 1.62. The different dipole lengths achieve circular polarization of the crossed dipole antenna 10. In other words, the relation between the lengths of the first legs 11 and the second legs 12 is set such that the crossed dipole antenna 10 is circular polarized.

A pair of feed lines 20*a*, 20*b* is coupled to the crossed dipole antenna 10. The pair of feed lines 20*a*, 20*b* may be understood as comprising a first feed line 20*a*, and a second feed line 20*b*. The first feed line 20*a* is coupled to the first leg pair 10*a* at the center 15. Each feed line 20*a*, 20*b* is split into two portions at the center 15 and the two portions are coupled to a first leg 11 and a second leg 12 of the first leg pair 10*a* and the second leg pair 10*b*, respectively. Thereby, the first feed line 20*a* is coupled to the first leg 11 and the second leg 12 of the first leg pair 10*a*, and the second feed line 20*b* is coupled to the second leg pair 10*b* at the center 15. Thereby, the second feed line 20*b* is coupled to the first leg 11 and the second leg 12 of the second leg pair 10*b*. The feed lines 20*a*, 20*b* are extending out from the center 15 between the first leg pair 10*a* and the second leg pair 10*b*. The feed lines 20*a*, 20*b* are extending in a direction of extension, wherein the direction of extension is at angles $\alpha$, $\beta$ with regards to the neighboring legs. The angles $\alpha$, $\beta$ are 45 degrees. Interference to the crossed dipole antenna 10 caused by the feed lines 20*a*, 20*b* is minimal when the angles $\alpha$, $\beta$ are 45 degrees. By the term "neighboring legs" it is meant, for example, the two closest legs of the crossed dipole antenna 10, and/or the second leg 12 of the first leg pair 10*a* and the first leg 11 of the second leg pair 10*b*. The direction of extension of the feed lines 20*a*, 20*b* may optimally reduce interference and/or disturbance of the first and second dipole of the crossed dipole antenna. The feed lines 20*a*, 20*b* are arranged adjacent to each other along their extension from the center 15. The feed lines 20*a*, 20*b* are extending towards the RFIC 21 (not shown, see FIG. 1 and FIG. 3). The above-mentioned exemplifying embodiment removes the need for crossing of the feed lines that feed the crossed dipole antennas 10, thereby creating a simpler and more compact solution. The above-mentioned exemplifying embodiment realizes the crossed dipole antenna 10 in planar technology. In other words, the crossed dipole antenna 10 and the pair of feed lines 20*a*, 20*b* are realized in a single RDL of the integrated circuit package 2.

Figure 3:
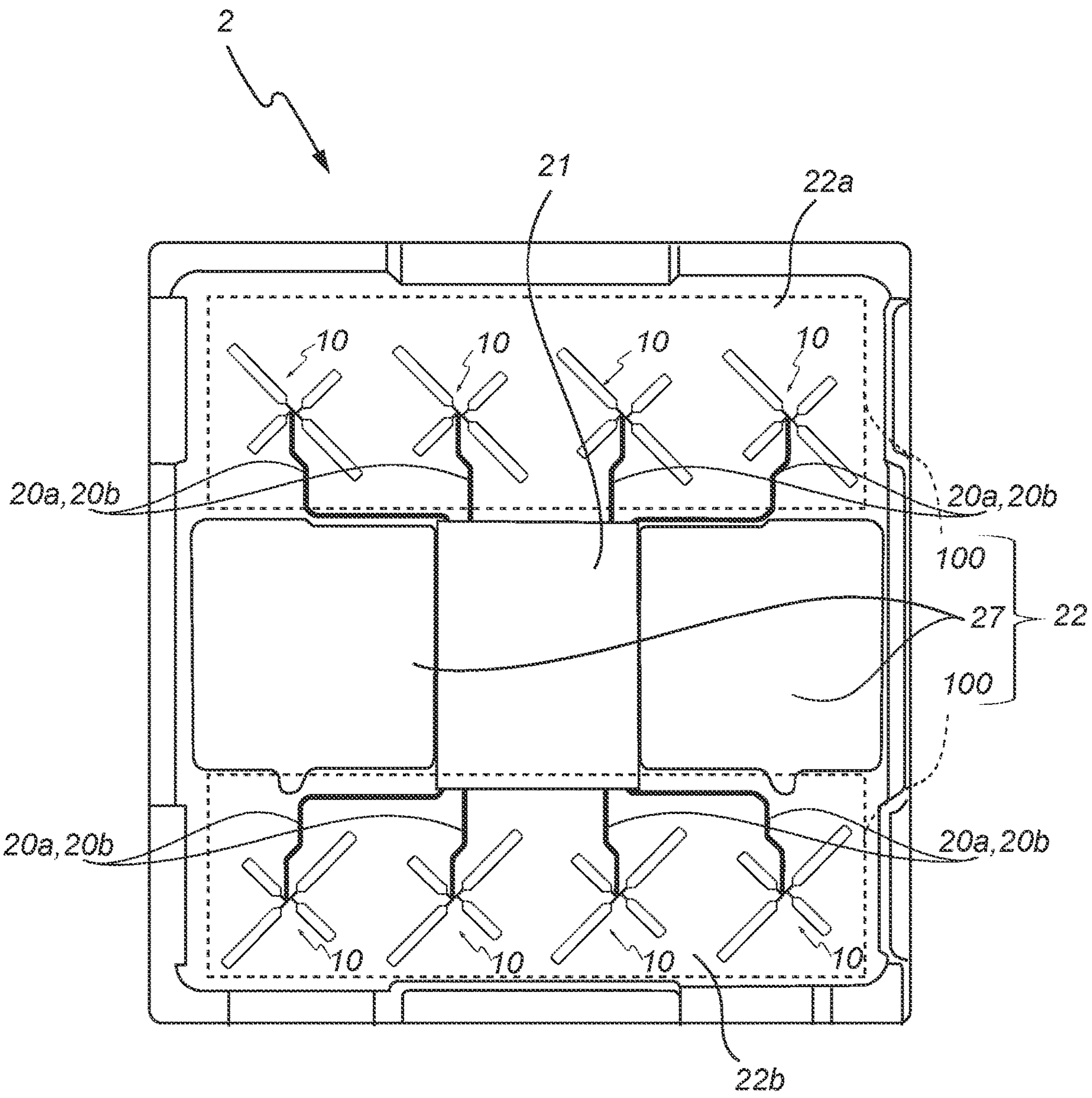
FIG. 3 schematically shows a perspective view of an integrated circuit package according to an exemplifying embodiment of the present invention.

FIG. 3 schematically shows a perspective view of an integrated circuit package 2 according to an exemplifying embodiment of the present invention. The perspective view of FIG. 3 shows the integrated circuit package 2 from below. In other words, the perspective view of FIG. 3 shows the first side 2*a* of the integrated circuit package 2, wherein the viewing angle is perpendicular to the first side 2*a*. The integrated circuit package 2, as shown in FIG. 3, has a rectangular shape, comprising four sides. The integrated circuit package 2 comprises an RFIC 21, and a fan-out area 22. The RFIC 21 has a rectangular shape and is arranged at the center of the integrated circuit package 2. Sides of the RFIC 21 are parallel to adjacent sides of the integrated circuit package 2. The fan-out area 22 is arranged around the RFIC 21. The fan-out area 22 comprises two antenna arrays 100. Each antenna array 100 is arranged in a respective fan-out area of the fan-out area 22. One of the antenna arrays 100 is arranged in the first fan-out area 22*a* of the fan-out area 22, and the other one of the antenna arrays 100 is arranged in the second fan-out area 22*b* of the fan-out area 22. The fan-out area 22 further comprises two grounding portions 27. The grounding portions 27 are configured to reduce interference and/or disturbance between the RFIC 21 and the antenna arrays 100, and between antenna arrays 100. The grounding portions 27 may comprise grounding vias and/or grounding lines. Each grounding portion 27 is arranged between a side of the RFIC 21, a side of the integrated circuit package 2 adjacent to said side of the RFIC 21, and the two antenna arrays 100.

Each antenna array 100 comprises four crossed dipole antennas 10. The four dipole antennas 10 of each antenna array 100 are arranged in a row. The two rows are parallel with a width of the integrated circuit package 2. The four dipole antennas 10 are arranged such that the longitudinal axis of the first dipole 11 of each dipole antenna 10 is parallel to a diagonal of the first side 2*a* of the integrated circuit package 2. The four dipole antennas 10 of each antenna array 100 are similarly oriented. The integrated circuit package 2 comprises eight pairs of feed lines 20*a*, 20*b*. Each pair of feed lines 20*a*, 20*b* is coupled to a respective crossed dipole antenna 10. The feed lines 20*a*, 20*b* coupled to the two crossed dipole antennas 10 arranged in the middle of the row of four dipole antennas 10 of each antenna array 100 are extending from the center of its respective crossed dipole antenna 10 to the RFIC 21. A first portion of the feed lines 20*a*, 20*b* of the two crossed dipole antennas 10 arranged at the beginning and the end of the row of four dipole antennas 10 of each antenna array 10 are extending from the center of its respective crossed dipole antenna 10 towards the closest grounding portion 27. A second portion of the feed lines 20*a*, 20*b* of the two crossed dipole antennas 10 arranged at the beginning and the end of the row of four dipole antennas 10 of each antenna array 10 are extending from the first portion of said feed lines 20*a*, 20*b* to the RFIC 21.

The integrated circuit package 2 comprises a plurality of bumps 26*a*, 26*b*, similar to those shown in FIG. 1. The bumps arranged at the RFIC 21 are interconnect elements 26*a*. The interconnect elements 26*a* may be understood as, for example, soldering bumps. The interconnect elements 26*a* are configured for coupling the integrated circuit package 2 to a PCB 5 (not shown; see FIG. 4 and FIG. 5) and/or another circuit. The bumps arranged at the fan-out area are dummy bumps 26*b*. The dummy bumps 26*b* are arranged around each crossed dipole antenna 10. The dummy bumps 26*b* may not be configured to be coupled to another circuit. The dummy bumps 26*b* may be configured to provide support and or stability for the integrated circuit package 2 when coupled to a PCB 5 or circuit. Further, the dummy bumps 26*b* may be configured to reduce disturbance and/or interference between the RFIC 21 and the crossed dipole antennas 10 or between dipole antennas 10.

Figure 4:
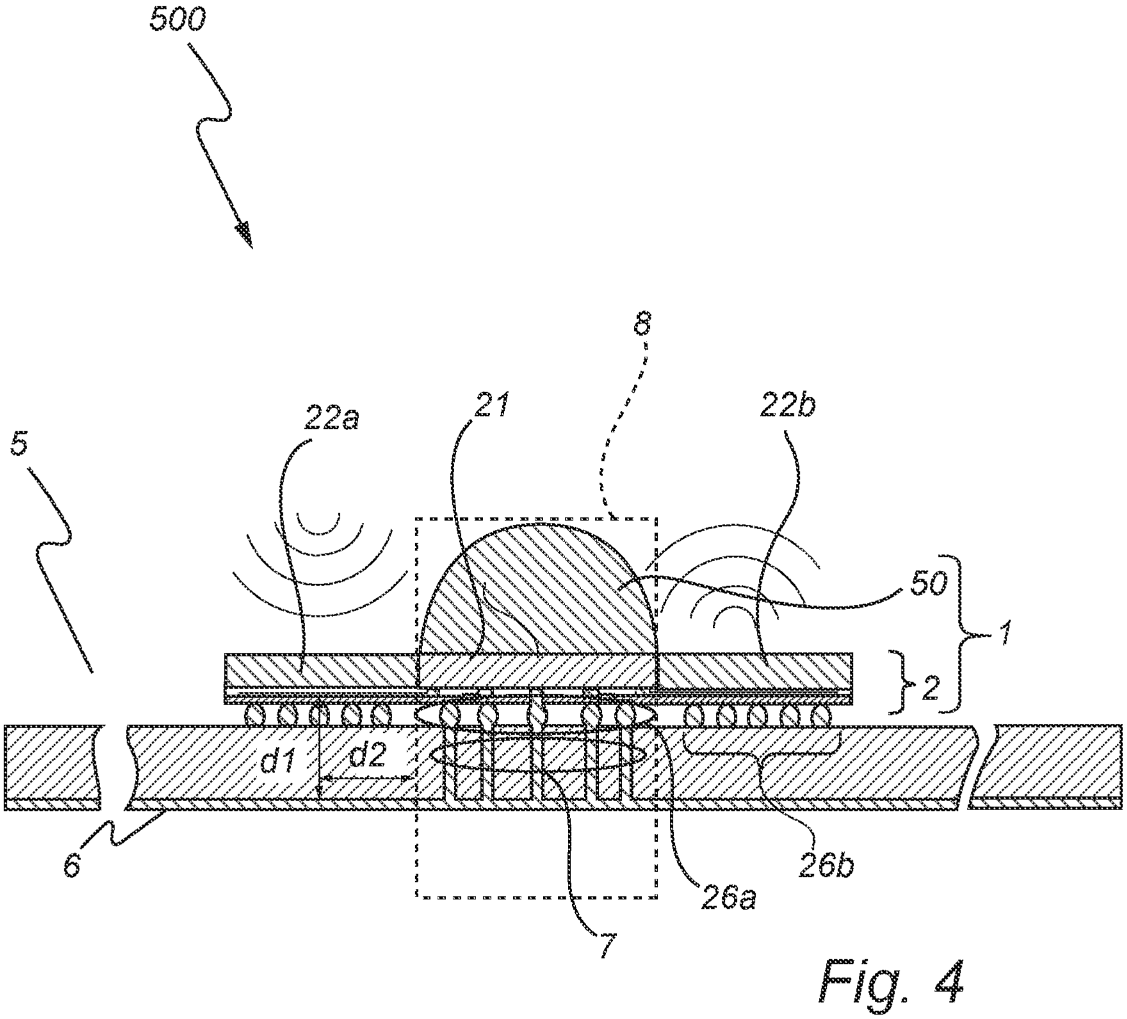
FIG. 4 schematically shows a cross-sectional view of a system according to an exemplifying embodiment of the present invention.

FIG. 4 schematically shows a cross-sectional view of a system 500 according to an exemplifying embodiment of the present invention. The system 500 comprises an arrangement 1 and a printed circuit board 5. The arrangement 1 comprises an integrated circuit package 2 and a heatsink element 50. The heatsink element 50 is arranged on the RFIC 21 of the integrated circuit package 2. The heatsink element 50 is arranged between the first fan-out area 22*a* and the second fan-out area 22*b* of the integrated circuit package 2. The heatsink element 50 has a curved shape, which may be understood as a semicircular shape comprising a bottom. The bottom of the heatsink element 50 is arranged on the RFIC 21. The heatsink element 50 is widest at the bottom. The shape and placement of the heatsink element 50 may be adapted to reduce interference and/or disturbance between the antenna arrays 100, and may increase the performance of beam steering of the antenna arrays 100. The arrangement 1 is mounted to the PCB 5. The arrangement 1 is mounted to the PCB by solder bumps 26*a*, 26*b*. The solder bumps 26*b* are arranged below the fan-out areas 22*a*, 22*b*. The solder bumps 26*a* comprise interconnect elements and are configured to connect the integrated circuit package 2 to the PCB 5. The solders bumps 26*a*, 26*b* are a part of the design, and provide an increased antenna performance and mechanical stability for the integrated circuit package 2. The PCB 5 comprises a reflective metal layer 6. The reflective metal layer 6 is arranged at a bottom side of the PCB 5, which is opposite to a side of the PCB on which the integrated circuit package 2 is mounted. The integrated circuit package 2 is arranged to the PCB 5 such that the antenna arrays 100 of the integrated circuit package 2 are arranged at a first distance d1 from the reflective metal layer 6. The first distance d1 is measured in a direction which is perpendicular to the reflective metal layer 6. By arranging the antenna arrays 100 at the first distance d1 from the reflective metal layer 6 results in constructive interference and/or an increased gain for the antenna arrays 100.

The PCB 5 comprises a plurality of vias 7. The plurality of vias 7 are configured for reflection of antenna signals of the antenna arrays 100. The plurality of vias 7 are arranged along a shape associated with a shape of a perimeter of the RFIC 21. The integrated circuit package 2 is arranged to the PCB 5 such that the plurality of vias 7 are arranged along and/or around the perimeter, or arranged along and/or around at a distance to the perimeter, of the RFIC 21. The plurality of vias 7 may comprise vias within the perimeter of the RFIC 21 as well. The integrated circuit package 2 is arranged to the PCB 5 such that the antenna arrays 100 of the integrated circuit package 2 are arranged at a second distance d2 from the plurality of vias 7. The second distance d2 is measured in a direction which is parallel with the reflective metal layer 6. In other words, the second distance d2 is measured in a direction which is perpendicular to the first distance d1. The second distance d2 is measured from a center of an antenna array 100 to the plurality of vias 7. It may be understood that the second distance d2 is the shortest distance between the center of the antenna array 100 and the plurality of vias 7. The heatsink element 50, the RFIC 21 and the plurality of vias 7 together form a side wall reflector 8. The side wall reflector 8 may be understood as an electric wall. The side wall reflector 8 may increase the gain of the antenna arrays 100. The antenna arrays 100 are configured for transmission and/or reception at a specific wavelength (i.e. at a specific frequency). The first distance d1 is equal to a quarter of the specific wavelength. The second distance d2 is equal to a one-half of the specific wavelength. The combination of the side wall reflector 8 and the reflective metal layer 6 may be understood as corner reflector antenna. The corner reflector antenna may further increase the constructive interference and/or the gain for the antenna arrays 100.

Figure 5:
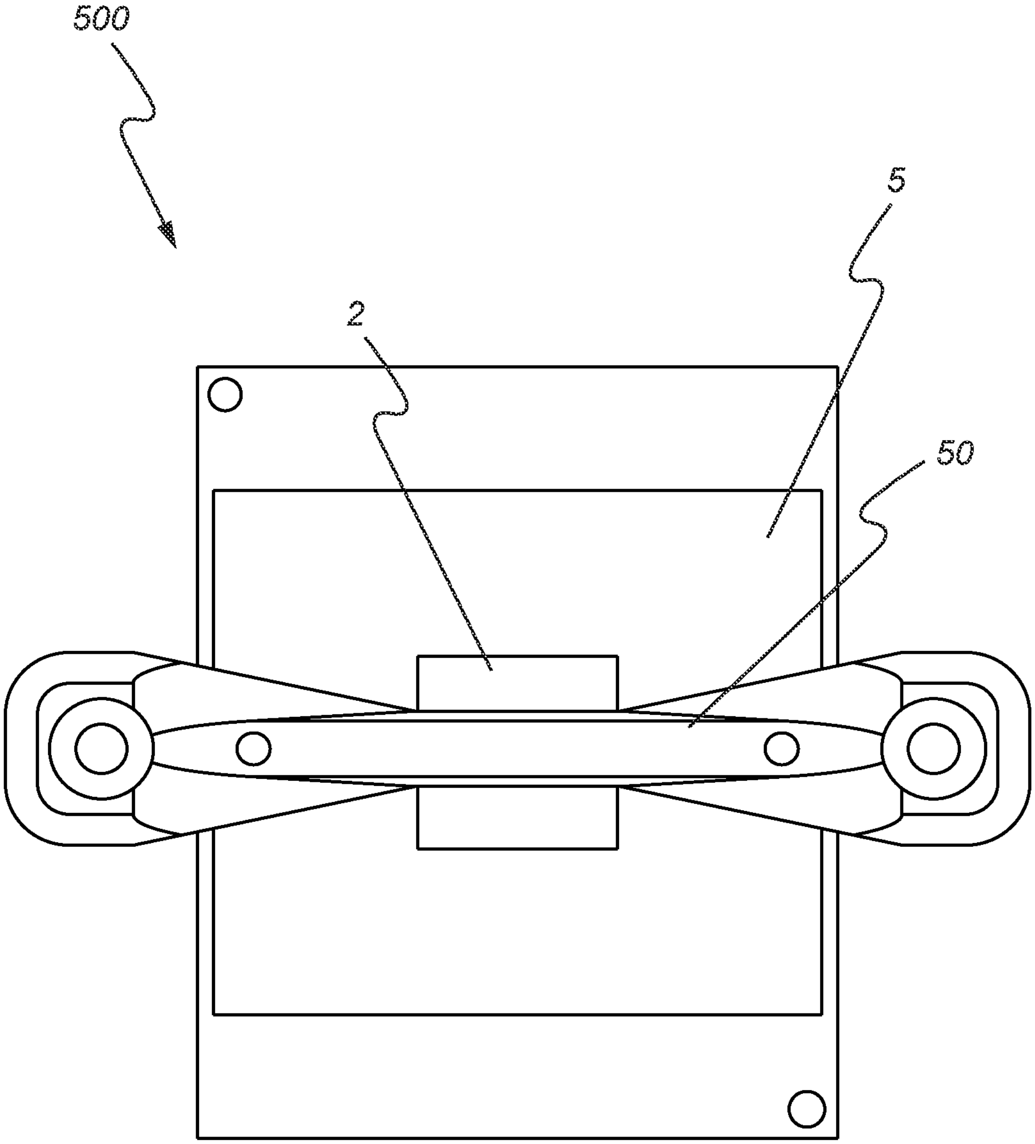
FIG. 5 schematically shows a perspective view of a system according to an exemplifying embodiment of the present invention.

FIG. 5 schematically shows a perspective view of a system 500 according to an exemplifying embodiment of the present invention. The system 500 comprises an integrated circuit package 2, a heatsink element 50 and a PCB 5. A first side 2*a* of the integrated circuit package 2 is soldered to the PCB 5 at a center of the PCB 5. The heatsink element 50 is arranged on the second side 2*b* of the integrated circuit package 2. The heatsink element 50 has a longitudinal extension. The heatsink element 50 comprises two end sections and a middle section. The middle section of the heatsink element 50 is arranged along a middle portion of the integrated circuit package 2. The middle portion of the integrated circuit package 2 comprises the RFIC 21 and grounding portions 27. The first fan-out area 22*a* and the second fan-out area 22*b* of the integrated circuit package 2 is not covered by the heatsink element 50. The width of the middle section of the heatsink element 50 approximately equal to a width or height of the RFIC 21. Thereby, the disturbance by the heatsink element 50 to the antenna arrays 100 comprised in the first and second fan-out areas 22*a*, 22*b* is reduced. Further, the end sections of the heatsink element 50 widen from the middle section toward respective longitudinal ends of the heatsink element 50. Each end section of the heatsink element 50 comprises two fastening holes. One of the fastening holes of each end section is configured for receiving a fastening means, such as a screw or a nut, for attaching the heatsink element 50 to the PCB 5. The other of the fastening holes of each end section is configured for receiving a fastening means, such as a screw or a nut, for attaching the system 500 to a housing and/or an auxiliary device. The shape of the heatsink element 50 is configured for reflecting the signal transmitted and/or received by the antenna arrays 100. In other words, the shape of the heatsink element 50 is configured for increasing the gain of the antenna arrays 100.

The person skilled in the art realizes that the present invention by no means is limited to the preferred embodiments described above. On the contrary, many modifications and variations are possible within the scope of the appended claims.

The invention claimed is:

1. An integrated circuit package, comprising:

a transceiver radio-frequency integrated circuit (RFIC);

a redistribution metal layer (RDL);

at least one antenna array formed in the RDL and arranged in a fan-out area, the at least one antenna array comprising at least one crossed dipole antenna comprising:

a first dipole comprising two first legs; and a second dipole comprising two second legs, wherein a respective first leg and a respective second leg of each of the first dipole and the second dipole cooperate to define respective leg pairs, such that there are two leg pairs; and at least one pair of feed lines formed in the RDL, wherein each feed line is coupled between a respective leg pair and the RFIC, and wherein the at least one pair of feed lines extends from a center of the at least one crossed dipole antenna towards the RFIC between the two leg pairs.

2. The integrated circuit package of claim 1, wherein the at least one antenna array and the at least one pair of feed lines are arranged in a plane of the RDL.

3. The integrated circuit package of claim 1, wherein the at least one pair of feed lines extends at an angle of 35-45 degrees with regards to a longitudinal axis defined by a neighboring first leg of a first leg pair.

4. The integrated circuit package of claim 3, wherein the at least one pair of feed lines extends at an angle of 35-45 degrees with regards to a longitudinal axis defined by a neighboring second leg of a second leg pair.

5. The integrated circuit package of claim 1, wherein the at least one crossed dipole antenna is a circular polarized antenna.

6. The integrated circuit package of claim 1, wherein a length of a first leg is between 1.52 and 1.68 of a length of a second leg.

7. The integrated circuit package of claim 1, wherein the two first legs have a first length such that the first dipole of the at least one crossed dipole antenna has a first angle of input admittance and the two second legs have a second length such that the second dipole of the at least one crossed dipole antenna has a second angle of input admittance.

8. The integrated circuit package of claim 7, wherein the first angle of input admittance and the second angle of input admittance differ by 90°.

9. The integrated circuit package of claim 1, wherein each of the at least one pair of feed lines are fed a signal by the RFIC, wherein the signals fed to the at least one pair of feed lines by the RFIC have a phase difference of 180°.

10. The integrated circuit package of claim 1, wherein at least two antenna arrays are formed in the RDL and arranged in respective fan-out areas arranged at opposites sides of the RFIC.

11. The integrated circuit package of claim 10, wherein each antenna array of the at least two antenna arrays comprises at least four crossed dipole antennas.

12. An apparatus comprising:

the integrated circuit package of claim 10; and a heatsink element arranged on the RFIC.

13. The apparatus of claim 12, wherein each antenna array of the at least two antenna arrays comprises at least four crossed dipole antennas.

14. A system comprising:

the integrated circuit package of claim 10;

a heatsink arranged on a first side of the RFIC; and a printed circuit board (PCB), wherein the integrated circuit package is mounted to the PCB such that the PCB is on a second side of the RFIC.

15. The system of claim 14, wherein the PCB comprises a reflective metal layer and a plurality of vias, and the RFIC is adjacent to the plurality of vias.

16. The system of claim 15, wherein at least one antenna array of the at least two antenna arrays is configured for communication at a specific wavelength, and is arranged at a first distance from the reflective metal layer and a second distance from the plurality of vias, wherein the first distance is a quarter of the specific wavelength, and the second distance is between one-half and three-quarters of the specific wavelength.

17. The system of claim 15, wherein the heatsink, the RFIC, and the plurality of vias form a reflector wall.

18. The system of claim 17, wherein the reflector wall is configured to increase a gain of the at least two antenna arrays.

19. The system of claim 17, wherein the reflective metal layer and the reflector wall form a corner reflector antenna.

20. The system of claim 19, wherein the corner reflector antenna is configured to increase a gain of the at least two antenna arrays.

* * * * *